United States Patent [19]
Studley

[11] 3,858,971
[45] Jan. 7, 1975

[54] HEAT CONVECTION COOLING SYSTEM FOR OPTICAL READOUT AND DISPLAY DEVICE

[75] Inventor: David K. Studley, Sunnyvale, Calif.

[73] Assignee: Quantor Corporation, Mountain View, Calif.

[22] Filed: Aug. 16, 1973

[21] Appl. No.: 389,049

[52] U.S. Cl. .................................................. 353/61
[51] Int. Cl. ..................... G03b 21/16, G03b 21/00
[58] Field of Search .............................. 353/52–61; 240/46.01, 47; 352/202, 146, 147; 355/30

[56] References Cited
UNITED STATES PATENTS

| | | | |
|---|---|---|---|
| 2,277,147 | 3/1942 | Rogers | 355/30 |
| 2,582,876 | 1/1952 | Meinig | 353/55 |
| 3,751,160 | 8/1973 | Martinez | 353/52 |

*Primary Examiner*—Harry N. Haroian
*Attorney, Agent, or Firm*—Townsend and Townsend

[57] ABSTRACT

Apparatus for cooling the light source in an optical readout and display device such as a microfiche viewer. An inverted U-shaped channel is provided which has a level portion interposed between the light source and the lens of the device, and an upwardly inclined portion extending from the level portion. The channel is constructed of heat conductive material so that excess radiant energy from the light source is absorbed by the level portion of the channel and conducted to the inclined portion. Ambient air is heated by the channel and rises along the inclined portion thereof. The movement of air through the channel cools the light source by means of heat convection, eliminating the need for a fan or other power driven cooling apparatus.

12 Claims, 3 Drawing Figures

HEAT CONVECTION COOLING SYSTEM FOR OPTICAL READOUT AND DISPLAY DEVICE

BACKGROUND OF THE INVENTION

The present invention relates to optical readout and display devices, and in particular to means for cooling the light source in such a device.

Libraries, record keeping institutions and the like have come to rely increasingly heavily on the use of microfiche and microfilm for storing reduced images of books and technical documents to minimize storage space. The documents can be viewed directly from the microfiche or microfilm by means of a display device or viewer which projects an enlarged image of the information stored on the film onto a viewing screen. Some display devices provide for photocopying of the enlarged image if desired. Projecting the enlarged image from the fiche requires a high intensity light source. In prior art viewers the adequate cooling of this light source has caused problems.

Microfiche and like viewers presently available generally use a fan to cool the light source and the parts of the viewer heated by the light source, namely, the condensing lens, the platen and supporting structure. The fans are relatively noisy and viewers of this type, particularly when a number of them are simultaneously operated are a source of annoyance and a severe practical deficiency in the use of microfiche and microfilm storage systems.

The present invention provides a conduit for heated air which extends from adjacent the light source to a position external to the device. The conduit, preferably an inverted U-shaped channel, has a level portion extending over the light source and an upwardly inclined portion extending from the level portion. The conduit is constructed of thermally conducting material so that heat radiation from the light source is absorbed by the level portion and conducted to the inclined portion of the conduit. In this manner, air in the conduit is heated and tends to rise along the inclined portion, thereby inducing an air convection current which draws cooling air past the light source.

The present invention eliminates the need for an active cooling mechanism such as a fan, hence eliminating the offensive noise from such a device. The present invention can thus be used in the library proper without offending other patrons of the library, and even if several devices are simultaneously used in a small room, they do not generate any noise. Also, since the devices require no power driven cooling mechanism, their power requirements and operating costs are reduced, and they require less maintenance.

In the preferred embodiment of the present invention, the conduit is thermally insulated from other parts of the viewer. Also, the heat source and the reflective mirror are attached to the conduit and not to the device proper. The light from the light source is directed through heat absorbing glass mounted to the conduit to minimize the amount of heat transmitted to the condensing lens and the platen.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DESCRIPTION OF THE PREFERRED EMBODIMENT

Figure 1:
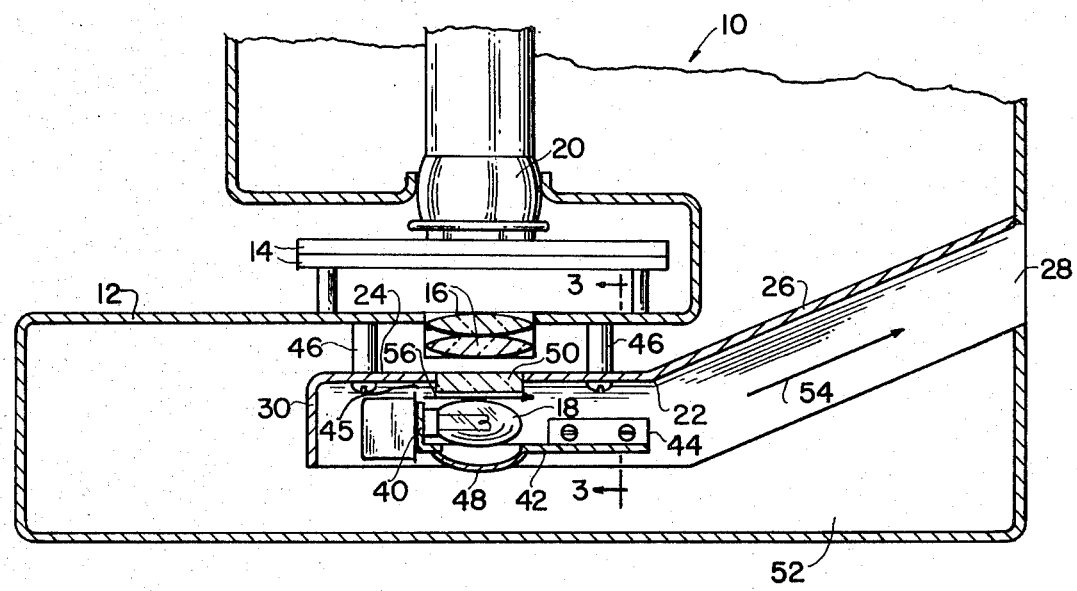
FIG. 1 is a fragmentary side elevation view of an optical readout and display device employing the present invention.

A microfiche viewer employing the apparatus of the present invention is illustrated by way of reference to FIG. 1. The viewer 10 has an outer casing 12, and a transparent platen 14 which fits into a recess in the casing. Platen 14 is adapted to hold a microfiche film and is movable to expose different parts of the film. A condensing lens assembly 16 is adapted to direct light from a high intensity light bulb 18 through the microfiche film held by platen 14. The image on the film is transmitted through lens 20 and displayed on a viewing screen (not shown).

Figure 2:
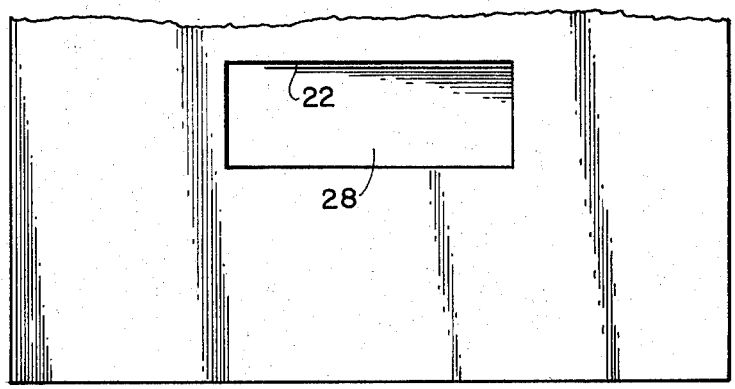
FIG. 2 is a fragmentary rear elevation view of the device of FIG. 1.
Figure 3:
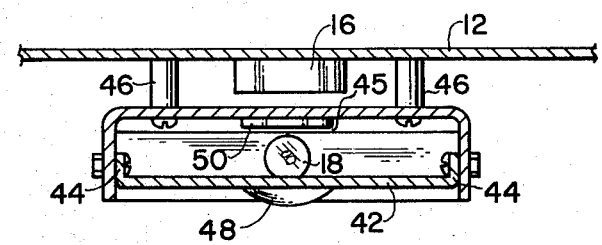
FIG. 3 is a rear cross-sectional elevation view taken along lines 3-3 of FIG. 1.

The present invention provides a conduit in the shape of an inverted U-shaped channel 22 for cooling light source 18. Channel 22 has a level portion 24 interposed between light source 18 and condensing lens 16, and an upwardly inclined portion 26 leading away from level portion 24. As illustrated in FIG. 2, inclined portion 26 terminates in an opening 28 in the casing 12 of viewer 10. Channel 22 is open at the bottom as illustrated to provide a continuous influx of cooling air therealong. Alternatively, the underside of the channel can be covered with an air-pervious material such as a protective grill (not shown), a porous or perforated plastic sheet or the like.

The light from light source 18 is directed upwardly by means of a concave mirror 48 in the horizontal portion of bracket 42. A glass plate 50 is secured, e.g., bonded to the upper portion of channel 22 between mirror 48 and condensing lens 16 in an aperture provided through channel 22. Glass plate 50 is constructed of glass which absorbs infrared radiation to minimize heat transfer from light source 18 to condensing lens 16 and platen 14 without substantially reducing visual radiation. Heat absorbed by glass plate 50 is transferred to channel 22 by conduction at the interface therebetween.

In operation, a major portion of the radiant energy in the visible spectrum from light source 18 passes through plate 50 of heat absorbing glass, either directly or after reflection from parabolic mirror 48. This radiant energy is then condensed by lens 16 and directed through a microfiche film held by platen 14. The light image from the film is then expanded by lens 20 and projected on a screen (not shown). Radiant infrared energy from light source 18 is primarily absorbed by the heat sink provided by glass plate 50 and the level portion 24 and bracket 42 of channel 22, the channel and bracket intercepting both upwardly and downwardly directed radiation respectively. The inner surfaces of channel 22 and bracket 42 are black to enhance this heat absorption and the outer surfaces of the channel portions are silvered, polished metal, or are plated to minimize heat radiation from the channel portions to the casing 12 of the viewer and a resulting temperature rise of the viewer. Channel 22 and bracket 42 are constructed of heat conductive material so that the radiant energy absorbed in level portion 24 and bracket 42 is conducted to inclined portion 26.

The base 52 of casing 12 provides a plenum of cooling air for channel 22. The cooling air in the interior of inclined portion 26 of channel 22 is heated by the sidewalls of the channel particularly at the lower end of the inclined portion due to the heat conducted from level portion 24. The heated air rises along the inclined portion 26 of channel 22 as illustrated by arrow 54 from the lower end to exhaust opening 28, thereby cooling the channel. The movement of air illustrated by arrow 54 draws heated air from between light source 18 and glass plate 50 through passage 45 as illustrated by arrow 56, thereby cooling both the light source and the glass plate. As heated air rises towards the exhaust opening, fresh cooling air is drawn into the channel and over the light source and the glass plate for a continuous, noiseless cooling of the components heated by the light source.

While a preferred embodiment of the present invention has been described above, it is apparent that modifications and adaptations of that embodiment will occur to those skilled in the art. However, it is to be expressly understood that such modifications and adaptations are within the spirit and scope of the present invention as set forth in the following claims.

What is claimed is:

1. Apparatus for cooling a light source in an optical readout and display device, said apparatus comprising a downwardly opening channel having a heat collecting portion disposed over the light source and an upwardly inclined portion extending from said level portion, said heat collecting portion including a glass portion above the light source allowing passage of light from the light source upwardly through the channel, said channel being constructed of thermally conducting material for the absorption of heat generated by said light source, the channel including surfaces for the transfer of heat to air in the channel and a resulting convection movement of cooling air from adjacent the light source along the inclined portion to a point remote from the light source.

2. Apparatus according to claim 1 wherein the glass portion is constructed of heat absorbing glass to inhibit heat transfer through said channel and enhance heat absorption by said channel.

3. Apparatus according to claim 2 and additionally comprising a concave reflector located below said light source and adapted to direct light from said light source through the glass portion of said channel.

4. Apparatus according to claim 1 and additionally comprising means for substantially thermally insulating said downwardly opening channel from the device.

5. Apparatus according to claim 4 wherein the light source is fixed to the channel to substantially thermally insulate said light source from the device.

6. Apparatus according to claim 1 wherein the surfaces of the channel are at least partially black to enhance absorption of heat from the light source and the transfer of heat to the air.

7. Apparatus as recited in claim 1 wherein the downwardly opening channel has an inverted U-shaped configuration.

8. In a microfiche viewer having a high energy light source, a condensing lens adapted to focus light from said light source through a microfiche film, and a concave mirror adapted to direct light from said light source at said lens, improved means for cooling the light source, which comprises:

conduit means constructed of thermally conducting material, said conduit means having a level portion interposed between the light source and the lens, and an upwardly inclined portion extending from and thermally coupled to the level portion; the conduit including an opening for communicating light from the source to the lens;

means for attaching the conduit means to the viewer, said attachment means thermally insulating said conduit means from said viewer;

means for attaching the light source to the conduit means; and a heat absorbing glass plate covering the opening in the level portion of the conduit means;

whereby cooling air within the conduit is heated by the conduit and drawn by convection along the inclined portion for discharge to the exterior of the viewer.

9. A microfiche viewer according to claim 8 wherein the conduit means comprises an inverted U-shaped channel.

10. A microfiche viewer according to claim 8 wherein the means for attaching the light source to the conduit means comprises a horizontal plate spanning the channel and attached to the sidewalls of said channel, and a flange extending upwardly from the horizontal plate and terminating adjacent the top of the channel to provide a passage for cooling air between said flange and said channel.

11. A microfiche viewer according to claim 8 wherein the means for attaching the light source to the conduit means additionally comprises means for attaching the concave mirror to the conduit means.

12. A microfiche viewer comprising a housing, means for holding a microfiche, a light source disposed in the interior of the housing, means for directing a light beam from the source through the fiche, and means for continuously cooling the light source comprising an elongate downwardly opening channel disposed in the interior, mounted to and spaced from the housing, the channel being constructed of a thermally conducting material having a first, generally horizontally oriented portion disposed over the light source, the first portion including a cutout for communicating the light beam to the fiche, the channel further having a second portion that is contiguous with and thermally coupled to the first portion, the second portion being further upwardly inclined from the first portion and in communication with an exhaust opening in the housing, a heat absorbing, light transmitting member covering the cutout for absorbing heat energy in the light beam, means preventing any substantial heat transfer from the source in a downward direction past an open side of the channel, means on surfaces of the channels facing the light source for facilitating the absorption of heat by the channel, and means on exterior surfaces of the channel inhibiting a heat transfer from such exterior surfaces to the housing, whereby air in a space surrounded by the channel is heated and drawn towards the exhaust opening by convection for discharge to the exterior of the viewer while simultaneously drawing fresh cooling air into the space for a continued cooling action.

* * * * *